United States Patent
Ghabra et al.

(10) Patent No.: US 10,091,633 B2
(45) Date of Patent: Oct. 2, 2018

(54) PASSIVE ENTRY PASSIVE START SYSTEMS EMPLOYING CONSUMER MOBILE DEVICES AS PORTABLE REMOTE CONTROL UNITS

(71) Applicant: Lear Corporation, Southfield, MI (US)

(72) Inventors: Riad Ghabra, Northville, MI (US); Craig Elder, Plymouth, MI (US)

(73) Assignee: Lear Corporation, Southfield, MI (US)

( * ) Notice: Subject to any disclaimer, the term of this patent is extended or adjusted under 35 U.S.C. 154(b) by 57 days.

(21) Appl. No.: 15/331,990

(22) Filed: Oct. 24, 2016

(65) Prior Publication Data
US 2018/0115859 A1 Apr. 26, 2018

(51) Int. Cl.
*H04W 4/80* (2018.01)
*H04B 5/00* (2006.01)
*H04W 8/00* (2009.01)

(52) U.S. Cl.
CPC ............ *H04W 4/80* (2018.02); *H04B 5/0031* (2013.01); *H04W 8/005* (2013.01)

(58) Field of Classification Search
CPC ....... H04W 4/80; H04W 4/008; H04W 8/005; H04B 5/0031; G08C 17/02; G08C 23/02; G08C 2201/93; B60W 10/30; B60W 10/08; B60W 50/00; B60W 2600/00
See application file for complete search history.

(56) References Cited

U.S. PATENT DOCUMENTS

| | | | | |
|---|---|---|---|---|
| 7,821,383 B2* | 10/2010 | Sultan | ................ | G07C 9/00309 340/425.5 |
| 8,751,065 B1* | 6/2014 | Kato | ................ | H04M 1/72533 340/426.13 |
| 9,008,917 B2* | 4/2015 | Gautama | ............... | B60W 10/30 455/41.2 |
| 9,110,772 B2* | 8/2015 | Huntzicker | ............. | G06F 17/00 |
| 9,875,649 B2* | 1/2018 | King | ...................... | G08C 17/02 |
| 2009/0096575 A1* | 4/2009 | Tieman | .............. | G07C 9/00309 340/5.62 |
| 2009/0096596 A1 | 4/2009 | Sultan et al. | | |
| 2009/0273438 A1* | 11/2009 | Sultan | ................ | G07C 9/00103 340/5.7 |

(Continued)

FOREIGN PATENT DOCUMENTS

CN 201682537 U 12/2010
JP 2009257027 A 11/2009

*Primary Examiner* — Pablo Tran
(74) *Attorney, Agent, or Firm* — Brooks Kushman P.C.

(57) ABSTRACT

A system includes a base station at a target device and a consumer mobile device such as a phone. The phone includes a wireless receiver, such as a near field communications (NFC) or low-frequency (LF) receiver. The base station includes a wireless transmitter of the same type. The phone and the base station each further include a transceiver such as a Bluetooth™ transceiver or Bluetooth™ low energy (BLE) transceiver. Upon the base station and the phone in a presence of the target device being detected as being matching devices, the phone turns on its receiver, if it is not already on. The transmitter of the base station then transmits a challenge signal. The transceiver of the phone transmits a response signal having an answer to the challenge signal to the transceiver of the base station. The base station enables a function of the target device when the answer is valid.

14 Claims, 3 Drawing Sheets

(56) References Cited

U.S. PATENT DOCUMENTS

| | | |
|---|---|---|
| 2012/0172010 A1 | 7/2012 | Oman et al. |
| 2014/0176301 A1* | 6/2014 | Fernandez Banares ............... G07C 9/00015 340/5.26 |
| 2014/0188348 A1 | 7/2014 | Gautama et al. |
| 2014/0293753 A1* | 10/2014 | Pearson ............... G08C 23/02 367/197 |
| 2014/0313009 A1 | 10/2014 | King et al. |

* cited by examiner

PASSIVE ENTRY PASSIVE START SYSTEMS EMPLOYING CONSUMER MOBILE DEVICES AS PORTABLE REMOTE CONTROL UNITS

TECHNICAL FIELD

The present disclosure relates to passive entry passive start (PEPS) systems employing consumer mobile devices such as smartphones as portable remote control units.

BACKGROUND

Passive entry passive start (PEPS) systems include a portable remote control unit and a base station. The remote control unit, such as a key fob ("fob"), is carried by a user. The base station is at a target device such as a vehicle. The fob and the base station wirelessly communicate with one another for remotely controlling the vehicle.

Passive entry functions provided by a vehicular PEPS system include automatically unlocking vehicle doors when a fob (which will be assumed to be authorized for discussion purposes) is detected in close proximity to the vehicle. The PEPS system should detect that the fob is in close proximity to the vehicle before unlocking the vehicle doors. Otherwise, an unauthorized user may be able to unlock the vehicle whenever the fob is within the general vicinity of the vehicle.

Passive start functions provided by a vehicular PEPS system include automatically starting the vehicle upon a user in possession of the fob pressing a start button located near the driver's seat. The PEPS system detects that the fob is located within the vehicle before starting the vehicle. Otherwise, an unauthorized user sitting within the vehicle may be able to start the vehicle whenever the user in possession of the fob is standing near the vehicle.

SUMMARY

A method includes, upon a base station at a target device and a phone in a presence of the target device being detected as being matching devices, transmitting a challenge signal from a wireless transmitter of the base station to a wireless receiver of the phone. A response signal having an answer to the challenge signal is transmitted from the phone to the base station. The base station enables a function of the target device when the answer is valid.

In an embodiment, the receiver of the phone is a near field communications (NFC) receiver, the transmitter of the base station is a NFC transmitter, and the challenge signal is a NFC challenge signal. In this case, the method may further include, upon the base station and the phone being detected as being matching devices, placing the NFC receiver of the phone into an operational mode for the NFC receiver to receive the NFC challenge signal. The NFC transmitter may be configured to transmit the NFC challenge signal over a communications range greater than a conventional NFC communications range. Placing the NFC receiver of the phone into the operational mode may include placing the NFC receiver of the phone into an amplified mode. The method may further include setting the NFC transmitter of the base station in an amplified mode with the NFC challenge signal transmitted from the NFC transmitter of the base station to the NFC receiver of the phone being amplified in accordance with the amplified mode of the NFC transmitter of the base station.

The method may further include removing the NFC receiver of the phone from the operational mode after a pre-set time period corresponding to a time period in which the challenge signal is expected to be transmitted from the base station.

In an embodiment, the receiver of the phone is a low-frequency (LF) receiver, the transmitter of the phone is a LF transmitter, and the challenge signal is a LF challenge signal.

The response signal transmitted from the phone to the base station may be transmitted by a Bluetooth™ transceiver of the phone for receipt by a Bluetooth™ transceiver of the base station. The Bluetooth™ transceiver of the phone and the Bluetooth™ transceiver of the base station may be Bluetooth™ low energy (BLE) transceivers.

The method may further include communicating Bluetooth™, low-frequency (LF), WiFi™, or the like communications between the phone and the base station to detect whether the phone and the base station are matching devices.

The method may further include measuring by the phone a received signal strength indicator (RSSI) of the challenge signal as received by the receiver of the phone. The response signal transmitted from the phone to the base station may further include the RSSI of the challenge signal.

Another method includes, upon a base station at a target device and a phone in a presence of the target device being detected by the base station as being matching devices, transmitting a challenge signal from a wireless transmitter of the base station. The base station receives, from the phone, a response signal having an answer to the challenge signal. The base station enables a function of the target device when the answer is valid.

A system includes a base station at a target device. The base station has a controller, a wireless transmitter, and a transceiver. The transmitter is configured to transmit a challenge signal upon the base station and a phone in a presence of the target device being detected as being matching devices. The transceiver is configured to receive a response signal having an answer to the challenge signal from the phone. The controller is configured to enable a function of the target device when the answer is valid.

DETAILED DESCRIPTION

Detailed embodiments of the present invention are disclosed herein; however, it is to be understood that the disclosed embodiments are merely exemplary of the present invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
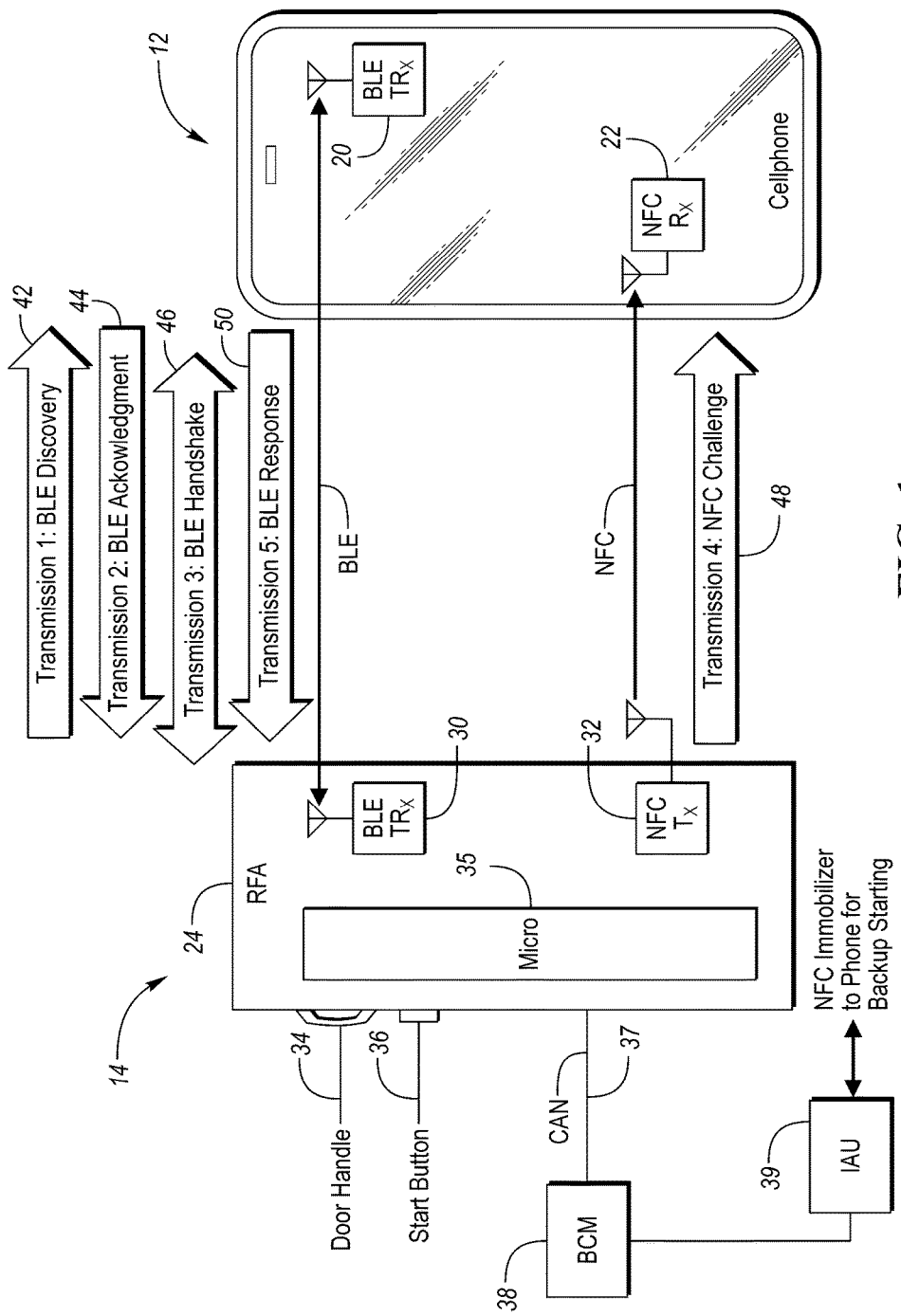
FIG. 1 illustrates a block diagram of an exemplary embodiment of a remote control system having a portable remote control unit, in the form of a consumer mobile device, and a base station.

Referring now to FIG. 1, a block diagram of an exemplary embodiment of a remote control system 10 is shown. Remote control system 10 includes a portable remote control unit 12 and a base station 14. Remote control unit 12 is to be carried by a user. Base station 14 is at a target device such as a vehicle, a house, a garage, a gate, a building, a door, a lighting system, or the like. In the description herein, the target device is assumed to be a vehicle. Base station 14 is configured to be able to control functions of the vehicle. Remote control unit 12 and base station 14 are operable for wirelessly transmitting/receiving signals to/from one another to enable the remote control unit to remotely control the vehicle via the base station.

Remote control system 10 is configured to perform passive entry passive start (PEPS) functions. PEPS capability enables remote control unit 12 to remotely control the vehicle automatically (or "passively") without user actuation of the remote control unit. As an example of a passive entry function, base station 14 unlocks a vehicle door in response to remote control unit 12 (which will assumed to be an authorized remote control unit) being in the vicinity of the vehicle. Base station 14 may detect for the presence of remote control unit 12 in the vicinity of the vehicle upon a user carrying the remote control unit touching a door handle of the vehicle. As an example of a passive start function, base station 14 starts the vehicle upon a user in possession of remote control unit 12 pressing a start button on the vehicle dashboard.

Conventionally, remote control unit 12 is a portable, handheld key fob ("fob"). In accordance with the present disclosure, remote control unit 12 is a consumer mobile device. The consumer mobile device may be a smartphone ("phone" or "cellphone"), a tablet, a wearable computer device such as a smartwatch or earbuds, or the like. In the description herein, the consumer mobile device is assumed to be a phone 12 (i.e., remote control unit 12 is assumed to be a phone 12). As such, the term "phone" in the description herein including the claims is intended to encompass consumer mobile devices such as smartphones, cellphones, tablets, wearable computer devices, or the like.

As shown in FIG. 1, phone 12 includes a communications circuit having a transceiver 20. In the exemplary embodiment, transceiver 20 is a Bluetooth™ low energy (BLE) transceiver 20. In other embodiments, transceiver 20 is some other type of Bluetooth™ transceiver, a Wi-Fi™ transceiver, or the like.

Phone 12 further includes a wireless receiver 22. In the exemplary embodiment, wireless receiver 22 of phone 12 is normally turned off, in a sleep mode, in some minimal type of operating power mode, or the like while the phone is operational. In other embodiments, wireless receiver 22 of phone 12 remains continuously turned on or is in a sleep mode, some minimal type of operating power mode, or the like while the phone is operational.

In the exemplary embodiment, wireless receiver 22 of phone 12 is a near field communications (NFC) receiver 22. NFC receiver 22 is part of a NFC circuit of phone 12. NFC receiver 22 is normally turned off, in a sleep mode, in some minimal type of operating power mode, or the like while phone 12 is operational. In other embodiments, wireless receiver 22 of phone 12 may be a different type of wireless receiver such as a low-frequency (LF) receiver. The LF receiver remains continuously turned on or is in a sleep mode, some minimal type of operating power mode, or the like while phone 12 is operational.

BLE transceiver 20 and NFC receiver 22 of phone 12 have their own antennas as indicated in FIG. 1. BLE transceiver 20 is operable for transmitting/receiving BLE signals to/from base station 14. NFC receiver 22 is operable for receiving NFC signals from base station 14.

As further shown in FIG. 1, base station 14 includes a remote function actuator (RFA) 24. RFA 24 is located at the vehicle. RFA 24 includes a communications circuit having a transceiver 30 of the same type as transceiver 20 of phone 12. As such, in the exemplary embodiment, transceiver 30 is a BLE transceiver 30. In other embodiments, transceiver 30 is some other type of Bluetooth™ transceiver, a Wi-Fi™ transceiver, or the like in correspondence with transceiver 20 of phone 12.

RFA 24 further includes a wireless transmitter of the same type as the wireless receiver of phone 12. Accordingly, in the exemplary embodiment, the wireless transmitter of RFA 24 is a NFC transmitter 32. NFC transmitter 32 is part of a NFC communications circuit of RFA 24. In other embodiments, the wireless transmitter of RFA 24 is a different type of wireless transmitter in correspondence with the type of wireless receiver of phone 12. For instance, in another embodiment, the wireless transmitter of RFA 24 is a LF transmitter with the wireless receiver of phone 12 being a LF receiver.

BLE transceiver 30 and NFC transmitter 32 of RFA 24 have their own antennas as indicated in FIG. 1. The antenna (or antennas) associated with BLE transceiver 30 are positioned at respective locations of the vehicle which may be known. The antenna (or antennas) associated with NFC transmitter 32 are positioned at known respective locations of the vehicle (e.g., center console, right vehicle door, left vehicle door, trunk, etc.). BLE transceiver 30 is operable for transmitting/receiving BLE signals to/from BLE transceiver 20 of phone 12. NFC transmitter 32 is operable for transmitting NFC signals to NFC receiver 22 of phone 12.

Conventionally, the BLE communications operating frequency is on the order of 2.4 GHz, the NFC communications operating frequency is on the order of 13.56 MHz, and the LF communications operating frequency is on the order of 125 kHz. Conventionally, the BLE communications range between phone 12 and base station 14 is much greater than the NFC communications range and the LF communications range between the two devices.

As described in greater detail herein, the phrases "near field communication" and "NFC" as used herein encompass: (i) conventional NFC communications which may take place between a transmitter and a receiver over a communication range up to a few centimeters; and (ii) "amplified" NFC communications which may take place between a transmitter and a receiver over a communication range up to a distance on the order of a couple of meters. LF communications may take place between a transmitter and a receiver over a communications range on the order of the communications range of amplified NFC communications. As such, the communications range of amplified NFC communications is similar to that of the LF communications.

As further shown in FIG. 1, RFA 22 further includes a microcontroller (or controller) 35. Controller 35 monitors door handle detection input and vehicle start button detection input to detect user actuation of a door handle or the vehicle start button. Controller 35 handles the communication processes of base station 14. Controller 35 controls the transmitting and receiving operations of BLE transceiver 30 and NFC transmitter 32 of base station 14, respectively, in handling communications processes of base station 14. Controller 34 is further configured to control functions of the vehicle.

In regards to PEPS capability, phone 12 and base station 14 engage in a series of (i) discovery/handshake ("handshaking") communications and (ii) authorization/authentication ("authorization") communications. The handshaking communications between phone 12 and base station 14 involve the phone and the base station being made aware of each other's presence while realizing that they are paired to one another. That is, the handshaking communications involve each of phone 12 and base station 14 being made aware of the presence of a matching device. In detail, phone 12 is made aware of the presence of a matching device that is base station 14 in the vicinity of the phone. Likewise, base station 14 is made aware of the presence of a matching device that is phone 12 in the vicinity of the base station. Phone 12 and base station 14 are matching devices to one another when the phone and the base station have been previously paired with one another.

In sum, upon a successful handshaking communications session, phone 12 and base station 14 realize that they are in the presence of one another and that they are matching devices. In further detail, the handshaking communications include a "discovery" communications phase during which phone 12 and base station 14 detect from discovery-related communications with one another that they are in the presence (i.e., in the vicinity) of one another. The handshaking communications further include a "handshake" communications phase during which phone 12 and base station 14 detect from handshake-related communications that they are matching devices.

The authorization communications between phone 12 and base station 14 occur after a successful handshaking communications session. In particular, the authorization communications between phone 12 and base station 14 occur upon the phone and the base station realizing that they are in the presence of one another and that they are matching devices. The authorization communications involve authorizing the enablement of a vehicle function (e.g., unlocking a vehicle door or starting the vehicle) corresponding to a detected user action. The authorization communications are intended to verify that phone 12 is authorized for remotely controlling the vehicle.

Figure 2:
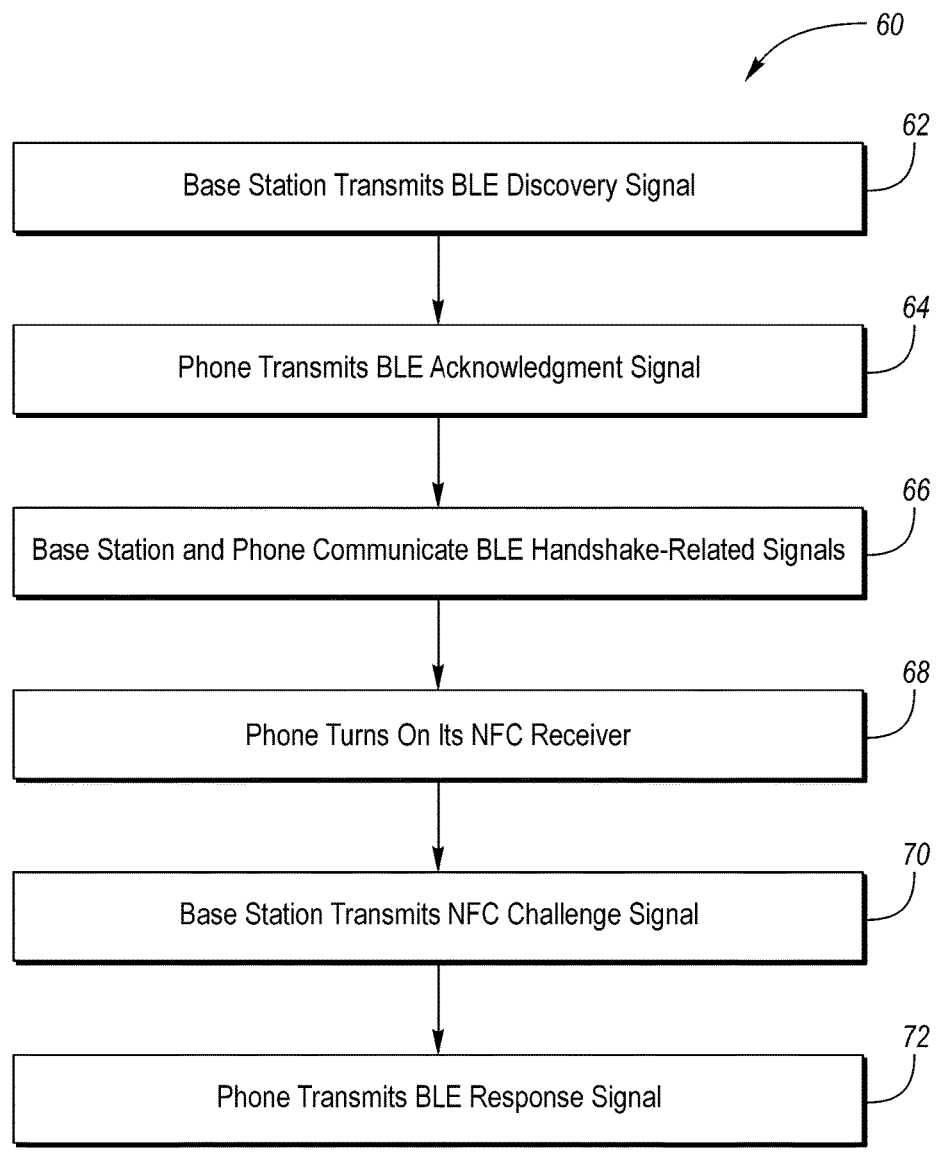
FIG. 2 illustrates a flowchart depicting operation of the remote control system.
Figure 3:
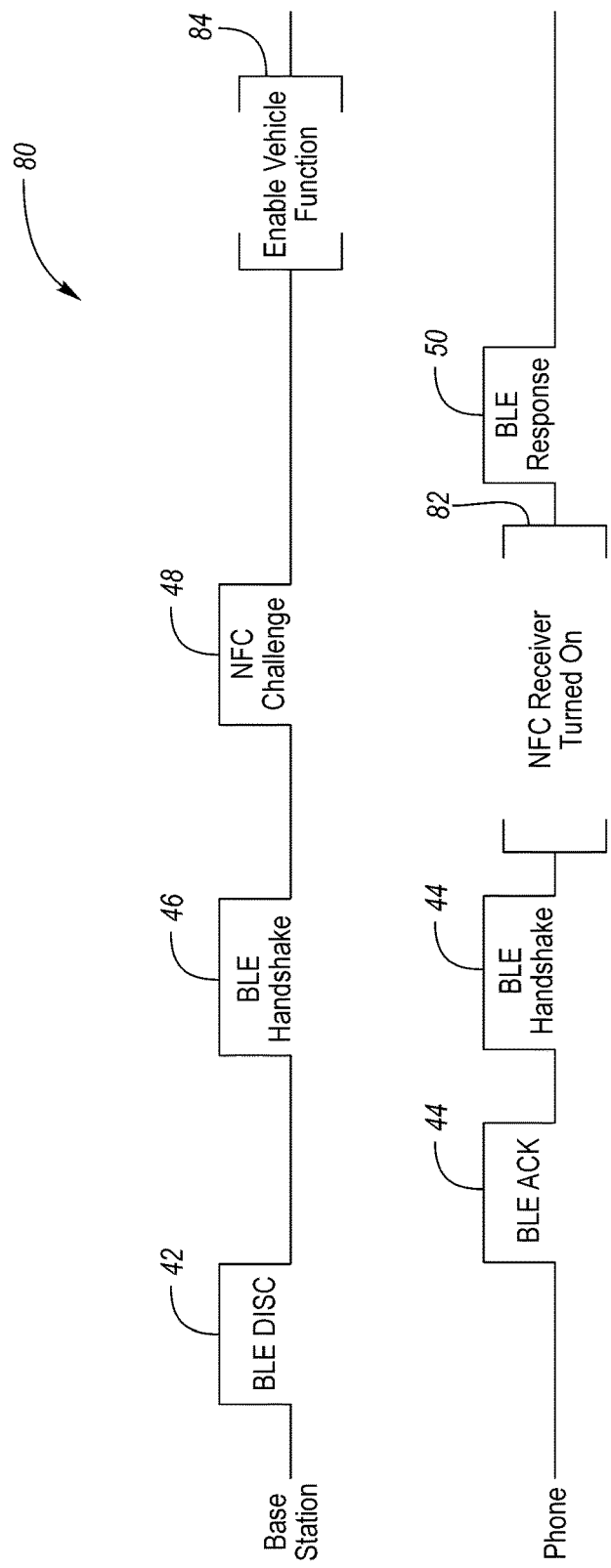
FIG. 3 illustrates a timing diagram of the communications between the portable remote control unit, in the form of a consumer mobile device, and the base station according to the remote control system operation shown in FIG. 2.

The handshaking communications and the authorization communications will now be further described with reference to all of FIGS. 1, 2, and 3. As noted, FIG. 1 illustrates a block diagram of remote control system 10 having phone 12 and base station 14. FIG. 2 illustrates a flowchart 60 depicting operation of remote control system 10. FIG. 3 illustrates a timing diagram 80 of the handshaking and authorization communications signals between phone 12 and base station 14 according to the remote control system operation shown in FIG. 2. It is to be understood that timing diagram 80 is an exemplary timing diagram that is not drawn in scale.

Base station 14 initiates the handshaking communications by transmitting a BLE discovery signal 42, as indicated in block 62 of flowchart 60. In particular, BLE transceiver 30 of base station 14 transmits BLE discovery signal 42. Conventionally, BLE discovery signal 42 includes identification and the like of base station 14 (or, perhaps, of the vehicle). BLE transceiver 30 may transmit BLE discovery signal 42 in response to detecting a user action such as touching a door handle or pressing the vehicle start button. In this regard, RFA 22 includes a door handle detection input 34 and a vehicle start button detection input 36. In this case, upon the user action being detected, BLE transceiver 30 transmits BLE discovery signal 42. Alternatively, BLE transceiver 30 periodically transmits BLE discovery signal 42 whenever operable. In this alternative case, no user action is required to be detected prior to BLE transceiver 30 transmitting BLE discovery signal 42.

Phone 12 (in particular, BLE transceiver 20 of the phone) receives BLE discovery signal 42 from base station 14 whenever the phone is within the BLE communications range (i.e., within the general vicinity) of the base station during the time the BLE discovery signal was transmitted. Conventionally, BLE transceiver 20 continually operates. Thus, BLE transceiver 20 is always ready to receive BLE discovery signal 42.

In response to phone 12 receiving BLE discovery signal 42 from base station 14, phone 12 transmits a BLE acknowledgement signal 44 for receipt by the base station, as indicated in block 64 of flowchart 60. In particular, BLE transceiver 20 of phone 12 transmits BLE acknowledgement signal 44 in response to receiving BLE discovery signal 42.

Phone 12 and base station 14 have each other's identification and are made aware that they are in the presence of one another as a result of the phone receiving BLE discovery signal 42 from the base station and the base station receiving BLE acknowledgment signal 44 from the phone. This corresponds to the "discovery" communications phase of the handshaking communications session between phone 12 and base station 14.

The handshaking communications between phone 12 and base station 14 continues with the "handshake" communications phase. In this phase, phone 12 and base station 14 communicate BLE handshake-related signals 46 with one another, as indicated in block 66 of flowchart 60. In particular, BLE transceiver 20 of phone 12 and BLE transceiver 30 of base station 14 transmit and/or receive BLE handshake-related signals 46 to and/or from one another. BLE handshake-related signals 46 involve a handshaking process between phone 12 and base station 14 for each other to detect whether they are matching devices. The handshaking process makes use of the identifications of phone 12 and base station 14 which was previously communicated between the phone and the base station. Phone 12 and base station 14 are matching devices when they have been previously paired with another. If phone 12 and base station 14 detect each other as being matching devices, then the handshaking communications session is successful with the phone and the base station realizing that they are in the presence of one another and that they are matching devices.

Upon the handshaking communications session being successful, the authorization communications begins. Phone 12 turns on (i.e., wakes up) NFC receiver 22 of the phone to begin the authorization communications, as indicated in block 68 of flowchart 60 and as indicated by NFC receiver time-on entry 82 of timing diagram 80. Conventionally, NFC receiver 22 of phone 12 remains turned off and is turned on as needed basis. Phone 12 controls NFC receiver 22 to "turn on" upon the phone learning that the handshaking communications session was successful. "Turning on" means to turn on NFC receiver 22 from a normally turned off, wake the NFC receiver from a sleep state, transition the NFC receiver to a full operating power mode from a minimal type of operating power mode, or the like. As indicated in timing diagram 80 by NFC receiver time-on entry 82 having a time duration, NFC receiver 22 is turned on for a brief period of time and is then turned back off. NFC receiver 22 is turned on in order to be in an operating condition to receive a NFC signal.

NFC communications conventionally take place over relatively small distances such as measured in centimeters (i.e., hence, the phrase "near field" as in near field communications (NFC)). Thus, according to conventional operation, NFC receiver 22 of phone 12 is only able to receive a NFC signal transmitted from an antenna of NFC transmitter 32 of base station 14 when the phone is positioned "near" the NFC transmitter antenna of the base station. The NFC transmitter antenna is at a known location of the vehicle. (For discussion purposes, as an example, it will be assumed that the NFC transmitter antenna is in the area of the driver side door handle.) Therefore, NFC receiver 22 is able to receive a NFC signal transmitted from base station 14 when phone 12 is positioned near the driver side door handle.

In accordance with the present disclosure, NFC receiver 20 of phone 12 and/or NFC transmitter 32 of base station 14 is modified such that NFC communications between the phone and the base station may take place over larger distances on the order of two meters. For instance, NFC receiver 20 may be modified to operate in a higher current active mode or amplified mode ("amplified mode") to enable the larger NFC communications range. Similarly, NFC transmitter 32 may be modified to operate in a higher current active mode or amplified mode ("amplified mode" to enable the larger NFC communications range. The modification of NFC receiver 20 and/or NFC transmitter 32 enables the NFC receiver to receive a NFC signal from the NFC transmitter whenever phone 12 is within two meters from the location on the vehicle of the antenna of the NFC transmitter (e.g., whenever the phone is within two meters of the driver side door handle as opposed to whenever the phone is within a few centimeters of the driver side door handle). Preferably, the NFC communications range is not more than two meters so as to comply with Thatcham's two meter maximum unlock required distance from the vehicle.

Base station 14 waits for a period of time after the handshaking communications session being deemed successful. Base station 14 waits for this period of time to allow NFC receiver 22 of phone 12 to be turned on. Upon expiration of the wait time period, NFC transmitter 32 of base station 14 transmits an encrypted NFC challenge signal 48 for receipt by NFC receiver 22, as indicated by block 70 of flowchart 60. NFC transmitter 32 may transmit NFC challenge signal 48 continually or periodically over a set duration sufficient to give the user in possession of phone 12 enough time to move into the two meter vicinity of the driver side door handle.

NFC receiver 22 of phone 12 receives NFC challenge signal 48 when the NFC receiver is turned on and the phone (i.e., the user in possession of the phone) is within two meters of the driver side door handle. Phone 12 analyzes the challenge in NFC challenge signal 48 and generates a response thereto. Phone 12 also measures the RSSI (received signal strength indicator) of NFC challenge signal 48 as received by NFC receiver 22. Phone 12 transmits the response including the RSSI to base station 14. In particular, BLE transceiver 20 of phone 12 transmits a BLE response signal 50 for receipt by BLE transceiver 30 of base station 14, as indicated by block 72 of flowchart 60.

BLE transceiver 30 of base station 14 receives BLE response signal 50 from BLE transceiver 20 of phone 12 as the phone is within two meters of the driver side door handle. Base station 14 analyzes the response to determine whether the response satisfies the challenge signal and to determine from the RSSI (in conjunction with other RSSI measurements as is conventionally known) the location of phone 12 (e.g., inside/outside of vehicle). If the response satisfies the challenge signal, then base station 14 determines phone 12 to be authorized for remotely controlling the vehicle. Base station 14 authorizes enablement of a vehicle function (e.g., unlocking a vehicle door) corresponding to detected user action upon determining that phone 12 is authorized, as indicated by enable vehicle function time entry 84 of timing diagram 80.

As described, in the exemplary embodiment, the wireless receiver of phone 12 is NFC receiver 22, the wireless transmitter of base station 14 is NFC transmitter 32, and BLE communications between the phone and the base station initially take place to detect the phone and the base station as being matching devices in the presence of one another. The BLE communications is followed by NFC receiver 22 of phone 12 being woken up and then NFC transmitter 32 of base station transmitting a NFC challenge signal for receipt by the NFC receiver of the phone. Phone 12 then transmits a response signal such as via its BLE transceiver for receipt by base station 14.

In other embodiments in which the wireless receiver of phone 12 is a LF receiver and the wireless transmitter of base station 14 is a LF transmitter, LF communications from the LF transmitter of the base station to the LF receiver of the phone initially take place to detect the phone and the base station as being matching devices in the presence of one another. Base station 14 then transmits a challenge signal for receipt by phone 12. In one embodiment, the challenge signal is a LF challenge signal transmitted by the LF transmitter of base station 14 for receipt by the LF receiver of phone 12. In this case, the LF receiver of phone 12 does not have to be turned on as the LF receiver of the phone is normally turned on. In other embodiments, the challenge signal is a Bluetooth™, BLE, Wi-FI™, or the like challenge signal transmitted from a corresponding transceiver of base station 14 for receipt by a corresponding transceiver of phone 12. In these other embodiments, the Bluetooth™, BLE, Wi-FI™, or the like transceivers of base station 14 and phone 12 are normally turned on. In response to the challenge signal, phone 12 transmits a response signal from its transceiver for receipt by base station 14.

As further shown in FIG. 1, RFA 24 of base station 14 may be in communication via a vehicle network such as a CAN bus 37 with other vehicle controllers such as a body control module (BCM) 38. Through CAN bus 37 and BCM 38, RFA 24 may communicate with an immobilizer antenna unit (IAU) 39. IAU 39 provides NFC/NFC immobilizer functions to phone 12 for backup starting (i.e., when the battery power of the phone is insufficient).

As such, the backup function can be performed with phone 12 when NFC is used in the battery-less mode in case the battery of the phone is dead. Similarly, this NFC backup mode can be used to gain entry into the vehicle in case the battery of phone 12 is dead.

As described, a consumer mobile device such as a cell phone can be used as a fob that gives access to a vehicle as part of a PEPS system. Conventionally, PEPS systems utilize a fob that is dedicated to the vehicle. The present disclosure describes how a generic cell phone with certain features can be used as a PEPS fob without adding additional circuitry to what already comes with the cell phone.

In conventional PEPS systems, the vehicle transmits LF (low-frequency) to the fob which responds at UHF (ultra-high frequency) with a response. The LF provides these advantages: a precise inside/outside fob location detection made possible by a reliable and stable LF RSSI measurement; and low current consumption on the fob side while powering an LF receiver that is constantly on and ready to receive a message.

The fob replacement concept in accordance with the present disclosure uses the BLE transceiver and the NFC circuit that are both widely present in modern cell phones. From a high level, as the user with the cell phone approaches the vehicle having a BLE transceiver that is looking for a mated device, the phone and the vehicle perform a handshake on BLE. If there is a match, then the cell phone momentarily turns on its NFC receiver to receive an encrypted challenge from the vehicle on the NFC link.

There is no increase in the cell phone current consumption because cell phones can have BlueTooth™ on all the time. The NFC, normally requiring very close proximity to the other device, uses a higher current active mode to receive the encrypted challenge at a distance on the order of two meters. The cell phone measures the RSSI of the NFC received signal in order to facilitate the inside/outside detection and to comply with Thatcham's two meter maximum unlock required distance from the vehicle. The encrypted cell phone response (including the RSSI measurement) to this NFC challenge is sent on BLE.

Since this NFC reception mode is only momentary in order to receive the encrypted challenge, it should not have any significant effect on the average current consumption. The advantages of this system is a consumer mobile device fulfilling all functions of a PEPS fob without additional circuitry while providing a truly handsfree PEPS system.

It is envisioned that potentially unknown factors can be addressed in future cell phone designs. Such potentially unknown factors may include the availability of the active NFC mode for long distance one-way reception, the performance of NFC and BLE in all use cases, orientations, positions on the person, and the accuracy and availability of RSSI measurement on the NFC channel. Certain functionality which may not yet be available in today's cell phones can be easily added by modifying the existing circuitry. The use of NFC for RSSI measurement lends itself well to the accuracy required due to the low frequency nature of this technology.

While exemplary embodiments are described above, it is not intended that these embodiments describe all possible invention forms. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A method comprising:
upon a base station at a target device and a phone in a presence of the target device being detected as being matching devices, placing a near field communications (NFC) receiver of the phone into an operational mode so that the NFC receiver is enabled to receive NFC signals from the base station, transmitting a NFC challenge signal from a NFC transmitter of the base station to the NFC receiver of the phone while the NFC receiver is in the operational mode, and wherein the NFC receiver is placed into the operational mode during a pre-set time period corresponding to a time period in which the NFC challenge signal is expected to be transmitted from the base station;
transmitting a response signal having an answer to the NFC challenge signal from the phone to the base station; and
enabling by the base station a function of the target device when the answer is valid.

2. The method of claim 1 wherein:
the NFC transmitter is configured to transmit the NFC challenge signal over a communications range greater than a conventional NFC communications range.

3. The method of claim 1 wherein:
placing the NFC receiver of the phone into the operational mode further includes placing the NFC receiver of the phone into an amplified mode.

4. The method of claim 1 further comprising:
setting the NFC transmitter of the base station in an amplified mode; and
wherein the NFC challenge signal transmitted from the NFC transmitter of the base station to the NFC receiver of the phone is amplified in accordance with the amplified mode of the NFC transmitter of the base station.

5. The method of claim 1 wherein:
the response signal transmitted from the phone to the base station is transmitted by a Bluetooth™ transceiver of the phone for receipt by a Bluetooth™ transceiver of the base station.

6. The method of claim 5 wherein:
the Bluetooth™ transceiver of the phone and the Bluetooth™ transceiver of the base station are Bluetooth™ low energy (BLE) transceivers.

7. The method of claim 1 further comprising:
communicating Bluetooth™ communications between the phone and the base station to detect whether the phone and the base station are matching devices.

8. The method of claim 1 further comprising:
communicating low-frequency (LF) communications between the phone and the base station to detect whether the phone and the base station are matching devices.

9. The method of claim 1 further comprising:
measuring by the phone a received signal strength indicator (RSSI) of the challenge signal as received by the receiver of the phone; and
wherein the response signal transmitted from the phone to the base station further includes the RSSI of the challenge signal.

10. A system comprising:
a base station at a target device, the base station having a controller, a near field communications (NFC) transmitter, and a transceiver;
a phone having a NFC receiver and a transceiver;
wherein when the base station and the phone are detected as being matching devices while the phone is in a presence of the base station, the phone is configured to place the NFC receiver into an operational mode so that the NFC receiver is enabled to receive NFC signals from the base station, the NFC transmitter is configured to transmit a NFC challenge signal to the NFC receiver while the NFC receiver is in the operational mode, and wherein the phone is further configured to place the NFC receiver into the operational mode during a pre-set time period corresponding to a time period in which the NFC challenge signal is expected to be transmitted from the base station;
wherein the transceiver of the base station is configured to receive a response signal having an answer to the NFC challenge signal from the transceiver of the phone; and
wherein the controller is configured to enable a function of the target device when the answer is valid.

11. The system of claim 10 wherein:
the transceiver of the base station and the transceiver of the phone are Bluetooth™ transceivers.

12. The system of claim 10 wherein:
the transceiver of the base station and the transceiver of the phone are configured to communicate discovery and handshaking signals with each other; and
the base station and the phone are configured to detect whether the base station and the phone are matching devices from the discovery and handshaking signals.

13. The system of claim 12 wherein:
the transceiver of the base station and the transceiver of the phone are Bluetooth™ transceivers.

14. The system of claim 13 wherein:
the Bluetooth™ transceivers are Bluetooth™ low energy (BLE) transceivers.

\* \* \* \* \*